United States Patent
Grohman

(10) Patent No.: US 8,382,003 B2
(45) Date of Patent: Feb. 26, 2013

(54) METHOD AND SYSTEM FOR CONTROLLING A MODULATING AIR CONDITIONING SYSTEM

(75) Inventor: Wojciech Grohman, Little Elm, TX (US)

(73) Assignee: Lennox Industries Inc., Richardson, TX (US)

(*) Notice: Subject to any disclaimer, the term of this patent is extended or adjusted under 35 U.S.C. 154(b) by 676 days.

(21) Appl. No.: 11/944,225

(22) Filed: Nov. 21, 2007

(65) Prior Publication Data

US 2009/0127346 A1 May 21, 2009

(51) Int. Cl.
*G05D 23/00* (2006.01)
(52) U.S. Cl. ........................ 236/1 C; 236/46 C; 700/276
(58) Field of Classification Search ............... 236/46 C, 236/1 C; 700/276
See application file for complete search history.

(56) References Cited

U.S. PATENT DOCUMENTS

| | | | |
|---|---|---|---|
| 4,922,861 A * | 5/1990 | Tsutsui et al. | 122/448.1 |
| 5,732,691 A | 3/1998 | Maiello et al. | |
| 5,829,674 A * | 11/1998 | Vanostrand et al. | 236/49.3 |
| 5,865,611 A | 2/1999 | Maiello | |
| 6,000,232 A * | 12/1999 | Witten-Hannah et al. | 62/89 |
| 6,179,212 B1 | 1/2001 | Banko | |
| 6,377,426 B2 | 4/2002 | Hugghins et al. | |
| 6,866,202 B2 | 3/2005 | Sigafus et al. | |
| 7,055,759 B2 | 6/2006 | Wacker et al. | |
| 7,083,109 B2 | 8/2006 | Pouchak | |
| 2002/0155405 A1 * | 10/2002 | Casey et al. | 431/60 |
| 2006/0280627 A1 * | 12/2006 | Jayanth | 417/410.5 |

FOREIGN PATENT DOCUMENTS

WO  WO 2005095870 A1 * 10/2005

OTHER PUBLICATIONS

"Arithmetic Mean Tutorial." Easycalculation.com. Nov. 4, 2005. Web. May 2, 2012. <http://easycalculation.com/statistics/learn-mean.php>.*

* cited by examiner

*Primary Examiner* — Cheryl J Tyler
*Assistant Examiner* — Jonathan Bradford

(57) ABSTRACT

A method for effecting cooperation between a modulating air conditioning system and a two-stage thermostat for satisfying an air conditioning load demand in a conditioned space includes: (a) operating the thermostat in a plurality of succeeding operating cycles to issue a first call signal or a second call signal indicating a first or second stage operation by the air conditioning system; the first and second stage operation being effected according to a first operating regimen to satisfy the air conditioning load demand; (b) operating the air conditioning system in response to the first and second call signals; the air conditioning system operating at a first power level when receiving the first call signal and operating at a predetermined second power level when receiving the second call signal; the first power level being established by the air conditioning system according a second operating regimen.

15 Claims, 3 Drawing Sheets

METHOD AND SYSTEM FOR CONTROLLING A MODULATING AIR CONDITIONING SYSTEM

BACKGROUND

Many air conditioning units, such as by way of example and not by way of limitation furnaces, are configured to operate either in an "off" mode (providing no heat) or in an "on" mode (providing heat at full capacity, with the burner and blower operating at substantially 100%). Such on-off operation may be referred to as single-stage operation. Single-stage furnace operation may cause temperature in a conditioned space, such as a home, to go up or down by several degrees, having an effect on both occupants' comfort and energy bills. Single-stage furnaces may be designed to keep a home warm on the coldest days, but such coldest days may account for only about 2.5% of a heating season. Additionally, the turning on or off of a single-stage furnace may be manifested by a sudden increased flow or gust of air noticeable by occupants and affecting occupants' comfort.

A more comfortable solution for furnace control may be to use a two-stage furnace control approach that employs two "on modes" of operation (sometimes referred to as a first stage of operation and a second stage of operation) for delivering different volumes of heated air. Such two-stage furnaces may increase the precision of temperature control available to a furnace and thus may increase occupants' comfort in a conditioned space. However, such two stage furnaces may still require a periodic turning on and off of air flow so that an undesired sudden flow or gust of air may still be noticeable by occupants and may still affect occupants' comfort.

A modulating furnace may ease comfort and cost problems associated with a sudden increased flow or gust of air by "modulating" output of a furnace among different capacities in small incremental stages during operation. A modulating furnace may, by way of example and not by way of limitation, operate between 40% and 100% of capacity in 10% increments, depending upon the comfort requirements of a homeowner and the temperature outside. Such modulating operation may result in lower operating costs, quieter and less obtrusive operation and more even temperatures in a conditioned space.

A modulating furnace is generally coupled for operation with a modulating thermostat designed for operation with a modulating furnace in the modulating range (e.g., 40%-100%) in increments (e.g., 10% increments). Such a modulating thermostat may significantly increase cost of installing a modulating furnace. It would be advantageous for a user to be able to install a modulating furnace without having to also replace an existing two-stage thermostat.

There is a need for a method and system for controlling a modulating air conditioning system, such as a heating system, using a two-stage thermostat.

SUMMARY

A method for effecting cooperation between a modulating air conditioning system and a two-stage thermostat for satisfying an air conditioning load demand in a conditioned space includes: (a) operating the thermostat in a plurality of succeeding operating cycles to issue a first call signal or a second call signal indicating a first or second stage operation by the air conditioning system; the first and second stage operation being effected according to a first operating regimen to satisfy the air conditioning load demand; (b) operating the air conditioning system in response to the first and second call signals; the air conditioning system operating at a first power level when receiving the first call signal and operating at a predetermined second power level when receiving the second call signal; the first power level being established by the air conditioning system according a second operating regimen.

A system for satisfying an air conditioning load demand in a conditioned space includes: (a) a modulating air conditioning system; and (b) a two-stage thermostat coupled with the air conditioning system. The thermostat operates in a plurality of succeeding operating cycles to issue a first call signal to the air conditioning system to call for first stage operation by the air conditioning system or to issue a second call signal to the air conditioning system to call for second stage operation by the air conditioning system. The thermostat operates according to a first operating routine to satisfy the air conditioning load demand. The air conditioning system is configured to operate at a first power level when receiving the first call signal, and to operate at a second power level when receiving the second call signal. The first power level is established by the air conditioning system according a second operating routine. The second power level is a predetermined power level.

It is, therefore, a feature of the present invention to provide a method and system for controlling a modulating air conditioning system, such as a heating system, using a two-stage thermostat.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

Embodiments of the present invention may be useful with a cooling unit, with a heating unit, with a humidifying unit or with another air conditioning or environmental conditioning unit. Solely for purposes of brevity and clearness of description the invention will be described herein in connection with a furnace unit with the understanding that one skilled in the art of environmental conditioning or air conditioning will comprehend the applicability of embodiments of the present invention to such other conditioning units in addition to a furnace unit.

Figure 1:
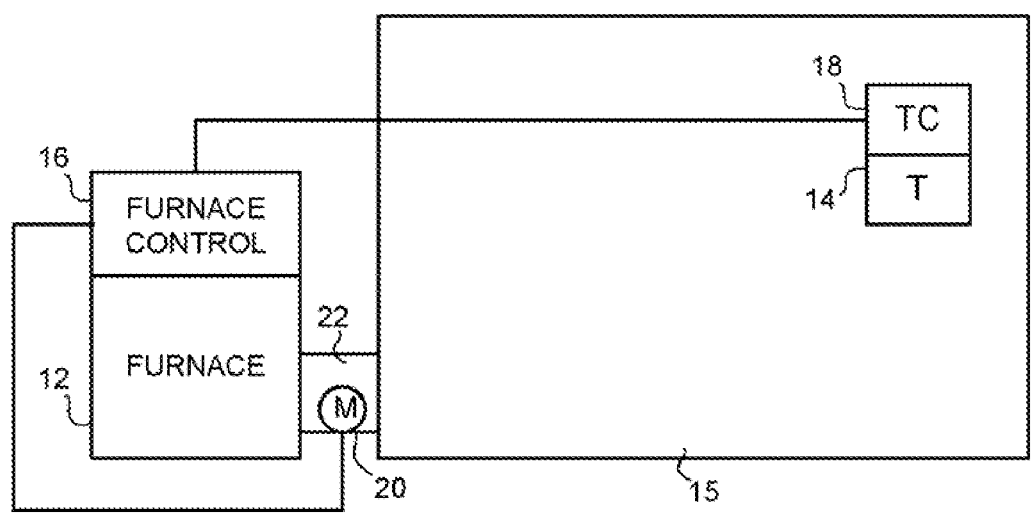
FIG. 1 is a schematic diagram of a representative air conditioning system configured for using embodiments of the present invention.

FIG. 1 is a schematic diagram of a representative air conditioning system configured for using embodiments of the present invention. In FIG. 1, a representative air conditioning system 10 may be configured for conditioning air in a conditioned space, including cooling air in the conditioned space or heating air in the conditioned space. The air conditioning system of the present invention may include an air cooling system and an air heating system, as may be understood by one skilled in the art of air conditioning systems. Thermostatic control of air temperature in a conditioned space may be effected using an air cooling system and an air heating system, as may also be understood by one skilled in the art of air conditioning systems. Solely for simplicity of description, the system and method of the present invention relating to air conditioning systems will be described in connection with operation of a furnace or heating unit, with the understanding that one skilled in the art of air conditioning systems may recognize how the present invention may be advantageously employed in connection with a cooling unit.

Air conditioning unit 10 may include a furnace unit 12 and a thermostat unit 14. Furnace unit 12 and thermostat unit 14 cooperate to condition air in a conditioned space 15.

Furnace unit 12 is a modulating furnace unit operating under direction of a furnace control unit 16 according to a furnace operating routine. Furnace control unit 16 may be configured to exercise a control routine, an operating routine or another algorithmic-based control regimen. Furnace control unit 16 and its furnace operating routine may be embodied in hardware, software, firmware or any combination of components appropriate to carry out the modulating furnace control functions described herein. Furnace unit 12 may also include a monitoring unit 20 situated in a furnace output locus 22. Monitoring unit 20 may be coupled with furnace control unit 16 for providing information to furnace control unit 16 such as, by way of example and not by way of limitation, temperature of conditioned air provided by furnace unit 12 to conditioned space 15.

Thermostat unit or sensor 14 is a two-stage thermostat unit operating under direction of a thermostat control unit 18 according to a thermostat operating routine. Thermostat control unit 1S may be configured to exercise a control routine, an operating routine or another algorithmic-based control regimen. Thermostat control unit 18 and its thermostat operating routine may be embodied in hardware, software, firmware or any combination of components appropriate to carry out the two-stage thermostat control functions described herein. Thermostat control unit 18 may alternatively be physically located remotely from thermostat 14 such as, by way of example and not by way of limitation, located with furnace control unit 16.

The furnace operating routine and thermostat operating routine may each be distributed between furnace unit 12 and thermostat unit 14 or may reside elsewhere at a site (not shown in FIG. 1) having communications with one or both of furnace unit 12 and thermostat unit 14.

In simple terms, thermostat unit 14 operates under direction of thermostat control unit 18 to meet heating demand for conditioning space 15. Furnace unit 12 operates under direction of furnace control unit 16 to provide heat to conditioned space 15 in response to thermostat unit 14.

Figure 2:
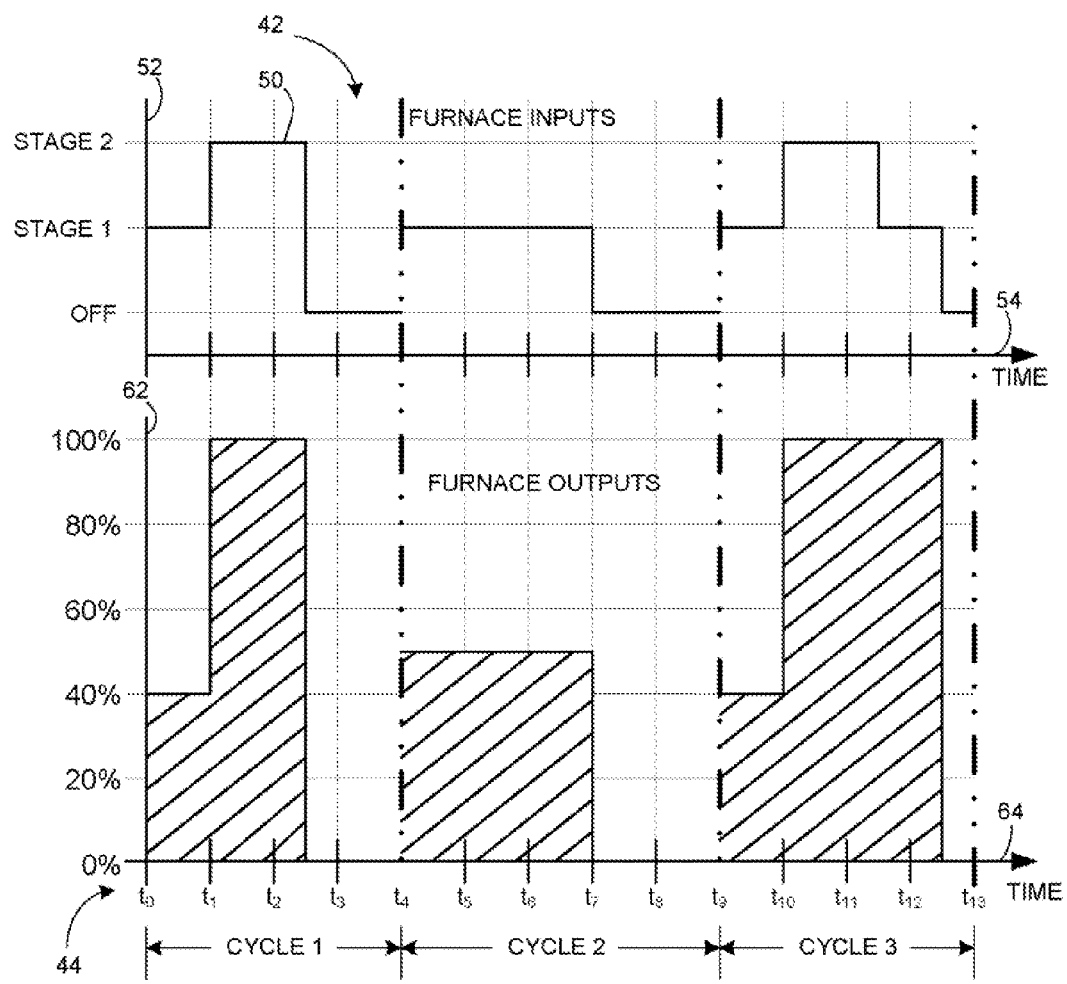
FIG. 2 is a graphic illustration of representative furnace inputs and furnace outputs in an air conditioning system using an embodiment of the present invention.

FIG. 2 is a graphic illustration of representative furnace inputs and furnace outputs in an air conditioning system using an embodiment of the present invention. In FIG. 2, a graphic presentation 40 includes a furnace input plot 42 and a furnace output plot 44.

Furnace input plot 42 presents a curve 50 plotted against a vertical axis 52 indicating the state of furnace input signals embodied in call signals presented by thermostat unit 14 to furnace unit 12 (see FIG. 1). Curve 50 is also plotted against a horizontal axis 54 representing time.

Furnace output plot 44 presents indications of percent of capacity of output as presented by furnace unit 12, such as at furnace output locus 22 (see FIG. 1). Furnace output plot 44 is plotted against a vertical axis 62 representing percent of output capacity for a furnace (e.g., furnace unit 12; FIG. 1). Furnace output plot 44 is also plotted against a horizontal axis 62 representing time. Axes 52, 62 are arranged in register to facilitate time-comparisons between plots 42, 44.

Regarding FIGS. 1 and 2 together, a user may establish a set point temperature using thermostat unit 14 in a manner known in the art, such as by way of example and not by way of limitation by manually setting thermostat unit 14. Thermostat, unit 14 seeks to satisfy demand in conditioned space 15 to establish the set point temperature in conditioned space 15. When the set point temperature is achieved in conditioned space 15, thermostat unit 14 will go to an "off" state until demand must again be met. Such periodic operation establishes operational cycles, such as an operational cycle CYCLE 1 during time interval $t_0$-$t_4$, an operational cycle CYCLE 2 during time interval $t_4$-$t_9$ and an operational cycle CYCLE 3 during time interval $t_9$-$t_{13}$. The duration of a respective cycles CYCLE 1, CYCLE 2, CYCLE 3 depends upon how long it takes thermostat unit 14 to achieve its set point temperature. For that reason cycles CYCLE 1, CYCLE 2, CYCLE 3 may not be equal in duration.

Thermostat unit 14 may issue a call signal for STAGE 1 operation during a time interval $t_0$-$t_1$. Furnace unit 12 may receive the call signal and respond by producing a predetermined capacity of heat (because this CYCLE 1 is an initial cycle). By way of example and not by way of limitation, the initial response by furnace unit 12 is 40% capacity in FIG. 2.

Thermostat unit 14 may issue a call signal for STAGE 2 operation during a time interval $t_1$-$t_{2.5}$. Furnace unit 12 may receive the call Signal and respond by producing a predetermined capacity of heat. In FIG. 2, a STAGE 2 call signal results in furnace unit 12 producing substantially 100% capacity output.

In the representative operation illustrated in FIG. 2, the set point temperature is achieved and thermostat unit 14 presents an OFF signal at time $t_{2.5}$. Furnace unit 12 responds to the OFF signal by presenting substantially 0% output at output locus 22.

At a time t4, thermostat unit 14 perceives a need to achieve its set point temperature and presents a STAGE 1 call signal to furnace unit 12. In this CYCLE 2, furnace unit 12 preferably establishes its response to a STAGE 1 call signal at a level related to at least one preceding operating cycle. In the illustrative operational sequence represented in FIG. 2, furnace unit 12 bases its response to a STAGE 1 signal upon an average value of power delivered to conditioned space 15 during preceding cycle CYCLE 1.

An exemplary calculation that may be performed by furnace control unit 16 (or another unit associated with furnace unit 12) may be:

During CYCLE 1, thermostat unit 14 calls for STAGE 1 heat for the initial 25% of CYCLE 1—that is, during the interval $t_0$-$t_1$. Thermostat unit 14 thereafter upstages to call for STAGE 2 heat for 37.5% of CYCLE 1—that is during the interval $t_1$-$t_{2.5}$. Average power during CYCLE 1—$P1_{AVG}$—may be calculated:

$$P1_{AVG} = 25\%(P1_1) + 37.5\%(P1_2) \quad [1]$$

Where, $P1_1$ is STAGE 1 power during CYCLE 1; and
$P1_2$ is STAGE 2 power during CYCLE 1.

In this example, STAGE 2 output from heater unit 12 is always set to 100%, so that During CYCLE 1, $P1_1 = 40\%$; and
$P1_2 = 100\%$ $$\therefore P1_{AVG} = 0.25(0.4) + 0.375(1) \quad [2]$$

$$\therefore P1_{AVG} = 47.5\% \quad [3]$$

During CYCLE 2 furnace unit 12 bases its response to a STAGE 1 signal upon an average value of power delivered to conditioned space 15 during CYCLE 1. As a result, STAGE 1 power during CYCLE 2 ($P2_1$) is set at 47.5% capacity (from expression [3]). This level is indicated by furnace output plot 44 during the interval $t_4$-$t_7$ in response to call signal STAGE 1 from thermostat unit 14 during the same interval, as indicated by furnace input plot 42. Interval $t_4$-$t_7$ is 60% of the duration of CYCLE 2.

Note that CYCLE 2 is longer than CYCLE 1 and CYCLE 3.

Average power during CYCLE 2—$P2_{AVG}$—may be calculated:

$$P2_{AVG}=60\%(P2_1) \quad [4]$$

$$P2_{AVG}=0.6(0.475)=0.285=28.5\% \quad [5]$$

During CYCLE 3, it is assumed for purposes of this illustration that 40% capacity is a minimum output permitted for furnace unit 12, so output of furnace unit 12 during the period of STAGE 1 power—interval $t_9$-$t_{10}$—is set at 40% rather than at the power level indicated by expression [5].

STAGE 1 power call during CYCLE 3 is ordered during the interval $t_9$-$t_{10}$—25% of the CYCLE 3 duration. STAGE 2 power call during CYCLE 3 is ordered during the interval $t_{10}$-$t_{12.5}$—62.5% of the duration of CYCLE 3. Average power during CYCLE 3—$P3_{AVG}$—may be calculated:

$$P3_{AVG}=25\%(P3_1)+62.5\%(P3_2) \quad [6]$$

$$P3_{AVG}=0.25(0.4)+0.625(1)=0.725=72.5\% \quad [7]$$

One may note that furnace unit 12 did not respond to downstaging from STAGE 2 call signal to STAGE 1 call signal during the interval $t_{11.5}$-$t_{12.5}$. This represents an optional limitation that may be imposed upon furnace unit 12 by furnace control unit 16 forbidding downstaging so that furnace unit 12 continued to present 100% output at output locus 22 despite thermostat unit 14 presenting a STAGE 1 call signal during that interval.

This illustrates the operating premise in the illustrative embodiment of FIGS. 1 and 2 of the invention in that thermostat unit 14 operates in response to thermostat control unit 18 according to its thermostat operating routine while seeking to meet demand in conditioned space 15. Concurrently, furnace unit 12 responds to furnace control unit 16 according to its furnace operating routine. In the exemplary embodiment, thermostat unit 14 may be regarded as having "override authority" over furnace control unit 16 to turn off furnace unit 12 (such as, by way of example and not by way of limitation, when demand is satisfied in conditioned space 15, or when a user turns off thermostat unit 14) and to order STAGE 2 operation (at substantially 100%).

Whenever thermostat unit 14 issues a STAGE 1 call signal, furnace unit 12 is free to operate in response furnace control unit 16 according to its furnace control routine. It may be the furnace control routine, for example, that establishes an operating limit for furnace unit 12 within a predetermined permitted STAGE 1 range of operating capacity—e.g. from 40% to a predetermined limit below 100% (FIG. 2). The particular power level (i.e., $Pn_1$) within the permitted STAGE 1 range selected for STAGE 1 operations is determined by aspects of one or more previous operating cycles. In the exemplary embodiment described in connection with FIGS. 1 and 2 the particular power level within the permitted STAGE 1 operating range is determined by an average value of power in the preceding operating cycle.

Figure 3:
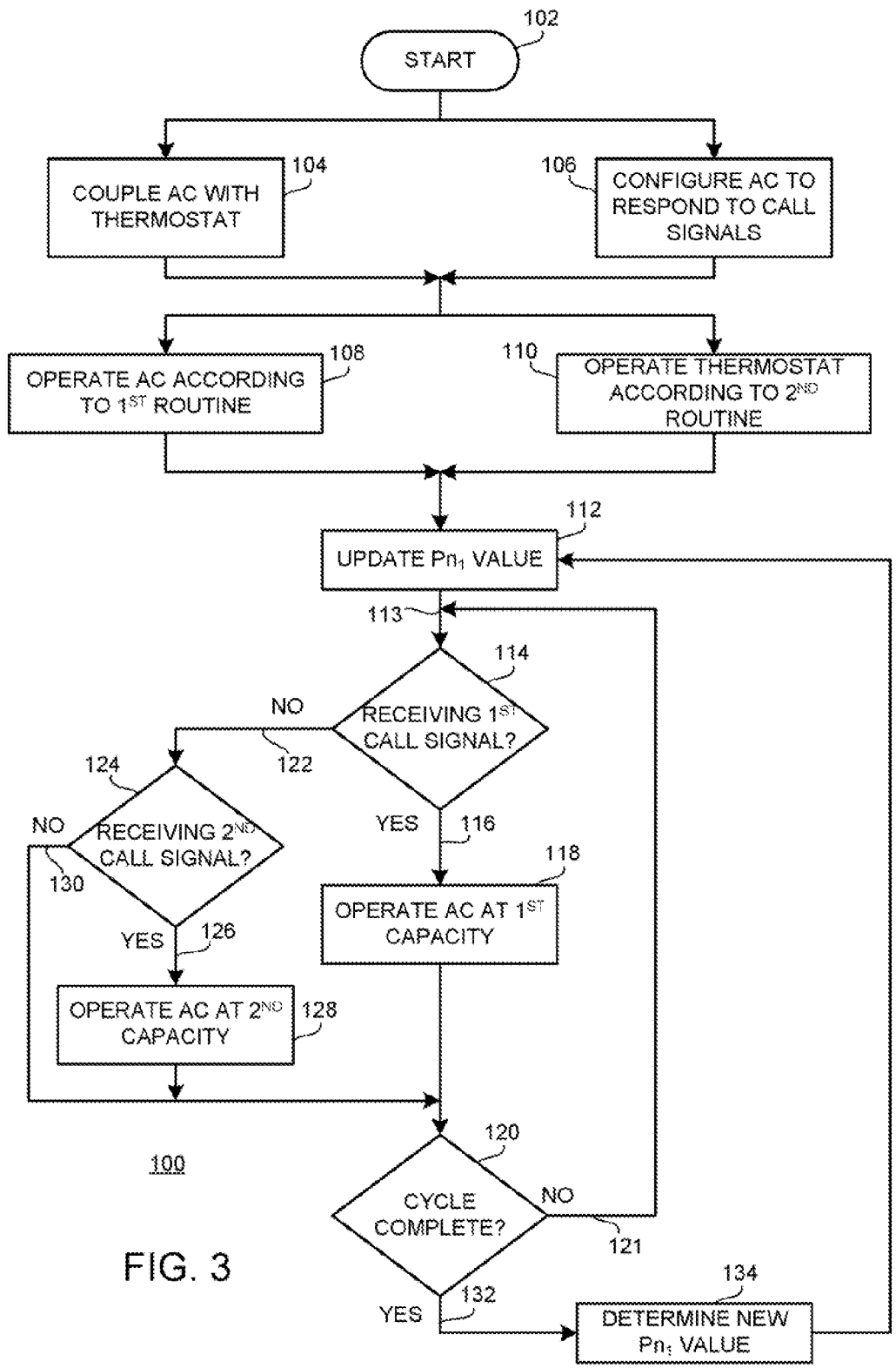
FIG. 3 is a flow chart illustrating an embodiment of the method of the present invention.

FIG. 3 is a flow chart illustrating an embodiment of the method of the present invention. In FIG. 3, a method 100 begins at a START locus 102. Method 100 continues by, in no particular order: (1) coupling the air conditioning system with a thermostat, as indicated by a box 104; and (2) configuring the air conditioning system to respond to a plurality of call signals received from the thermostat, as indicated by a box 106.

Method 100 continues with, in no particular order: (1) operating the air conditioning system according to a first control routine, as indicated by a box 108; and (2) operating the thermostat according to a second control routine in a plurality of succeeding cycles seeking to satisfy an air conditioning load demand in a conditioned space, as indicated by a box 110.

Method 100 may continue with the step of updating the STAGE 1 power value $Pn_1$ (i.e., the power capacity at which the furnace unit should operate in the $n^{th}$ cycle during STAGE 1 operations) for use by the furnace during STAGE 1 operations, as indicated by a box 112. The STAGE 1 power value may be set at a predetermined value for a first operating cycle, and may be based upon one or more previous operating cycles' average power (or another parameter or parameters) for operating cycles that follow the initial operating cycle. A minimum value below which the furnace unit may not operate in STAGE 1 may be established.

When the STAGE 1 power value $Pn_1$ is updated, method 100 may continues by posing a query whether a first call signal (e.g., a STAGE 1 call signal) is being received by the furnace unit from the thermostat, as indicated by a query block 114. If a first call signal is being received by the furnace unit from the thermostat, method 100 proceeds from query block 114 via a YES response line 116 and operates the furnace at a first capacity—determined by the value of power value $Pn_1$ according to its furnace operating routine, as indicated by a block 118. If a first call signal is not being received by the furnace unit from the thermostat, method 100 proceeds from query block 114 via a NO response line 122 and poses a query whether a second call signal (e.g., a STAGE 2 call signal) is being received by the furnace unit from the thermostat, as indicated by a query block 124.

If a second call signal is being received by the furnace unit from the thermostat, method 100 proceeds from query block 124 via a YES response line 126 and operates the furnace at a second capacity (e.g., at substantially 100% in the example described in connection with FIGS. 1 and 2) according to its furnace operating routine, as indicated by a block 128. If a second call signal is not being received by the furnace unit from the thermostat, method 100 proceeds from query block 124 via a NO response line 130.

Method 100 continues by posing a query whether the extant operating cycle is complete, as indicated by a query block 120. An extant operating cycle may be complete, by way of example and not by way of limitation, when a new operating cycle starts (e.g., as indicated by way of example and not by way of limitation, by issuance of a new first or second call signal), when a predetermined time out period has elapsed, when a user turns off the thermostat unit or for another reason.

If the extant operating cycle is not complete, method 100 continues via a NO response line 121 to a locus 113. Method 100 may proceed from locus 113 to carry out steps described above in connection with blocks 114, 118, 124, 128, 120.

If the extant operating cycle is complete, method 100 proceeds via a YES response line 132 and a new power value $Pn_1$ for STAGE 1 operations is determined, as indicated by a block 134. Method 100 thereafter returns to block 112 and may carry out steps described above in connection with, blocks 112, 114, 118, 124, 128, 120, 134.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A method for effecting cooperation between a modulating air conditioning system and a two-stage thermostat for satisfying an air conditioning load demand in a conditioned space; the method comprising:
    producing a first call signal, based on at least one previous operating cycle of said modulating air conditioning system, from said two-stage thermostat indicating a first stage operation of said modulating air conditioning system; an output capacity of said first stage operation being determined by an average of a value of power used in said at least one previous operating cycle; and
    producing a second call signal from said two-stage thermostat when said first call signal is not produced, indicating a second stage operation of said modulating air conditioning system, an output capacity of said second stage operation being greater than said output capacity of said first stage operation, and wherein said average of a value of said power is calculated by a sum of a percentage of said power used during a first time interval in said first stage and a percentage of said power used during a second time interval in said second stage.

2. The method for effecting cooperation between a modulating air conditioning system and a two-stage thermostat as recited in claim 1 wherein said output capacity of said second stage is one hundred per cent of said modulating air conditioning system.

3. The method for effecting cooperation between a modulating air conditioning system and a two-stage thermostat as recited in claim 1 wherein said modulating air conditioning system is at least one of a cooling system or a heating system.

4. The method for effecting cooperation between a modulating air conditioning system and a two-stage thermostat as recited in claim 1 wherein said average of a value of power is an average of a value of power of a plurality of preceding operating cycles.

5. The method for effecting cooperation between a modulating air conditioning system and a two-stage thermostat as recited in claim 1 wherein said output capacity of said first stage is less than one hundred percent of said modulating air conditioning system.

6. A method for manufacturing a modulating air conditioning system, comprising:
    coupling a modulating furnace unit to a two-stage thermostat control unit, said two-stage thermostat configured to produce a first call signal, based on at least one previous operating cycle of said modulating air conditioning system, from said two-stage thermostat indicating a first stage operation of said modulating air conditioning system; an output capacity of said first stage operation being determined by an average of a value of power used in said at least one previous operating cycle; and
    producing a second call signal from said two-stage thermostat when said first call signal is not produced, indicating a second stage operation of said modulating air conditioning system, an output capacity of said second stage operation being greater than said output capacity of said first stage operation, and wherein said average of a value of power is calculated by a sum of a percentage of said power used during a first time interval in said first stage and a percentage of said power used during a second time interval in said second stage; and
    coupling a thermostat control to said modulating air conditioning system and said two-stage thermostat control unit, said thermostat control unit configured to have an operating routine for implementing signals received from said two-stage thermostat control unit.

7. The method recited in claim 6 wherein said output capacity of said second stage operation is one hundred per cent of said modulating said air conditioning system.

8. The method recited in claim 6 wherein said modulating air conditioning system is at least one of a cooling system or a heating system.

9. The method recited in claim 6 wherein said output capacity of said first stage operation is less than one hundred per cent of power level capability of said air conditioning system.

10. The method recited in claim 6 wherein said average of a value of power is an average of a value of power of a plurality of preceding operating cycles.

11. A system for satisfying an air conditioning load demand in a conditioned space; the system comprising:
    a modulating air conditioning system; and
    a two-stage thermostat coupled with said modulating air conditioning system; said two-stage thermostat configured to produce a first call signal, based on at least one previous operating cycle of said modulating air conditioning system indicating a first stage operation of said modulating air conditioning system, an output capacity of said first stage operation being determined by an average of a value of power used in said at least one previous operating cycle;
    said two-stage thermostat further configured to produce a second call signal when said first call signal is not produced, indicating a second stage operation of said modulating air conditioning system, an output capacity of said second stage operation being greater than said output capacity of said first stage operation, and wherein said average of a value of power is calculated by a sum of a percentage of said power used during a first time interval in said first stage and a percentage of said power used during a second time interval in said second stage.

12. A system for satisfying an air conditioning load demand in a conditioned space as recited in claim 11 wherein said air conditioning system is at least one of a cooling system or a heating system.

13. A system for satisfying an air conditioning load demand in a conditioned space as recited in claim 11 wherein said output capacity of said second stage operation is one hundred per cent of said modulating air conditioning system.

14. A system for satisfying an air conditioning load demand in a conditioned space as recited in claim 11 wherein said output capacity of said first stage operation is less than one hundred per cent of said modulating air conditioning system.

15. A system for satisfying an air conditioning load demand in a conditioned space as recited in claim 11 wherein said average of a value of power is an average of a value of power of a plurality of preceding operating cycles.

* * * * *